United States Patent Office 3,159,315
Patented Dec. 1, 1964

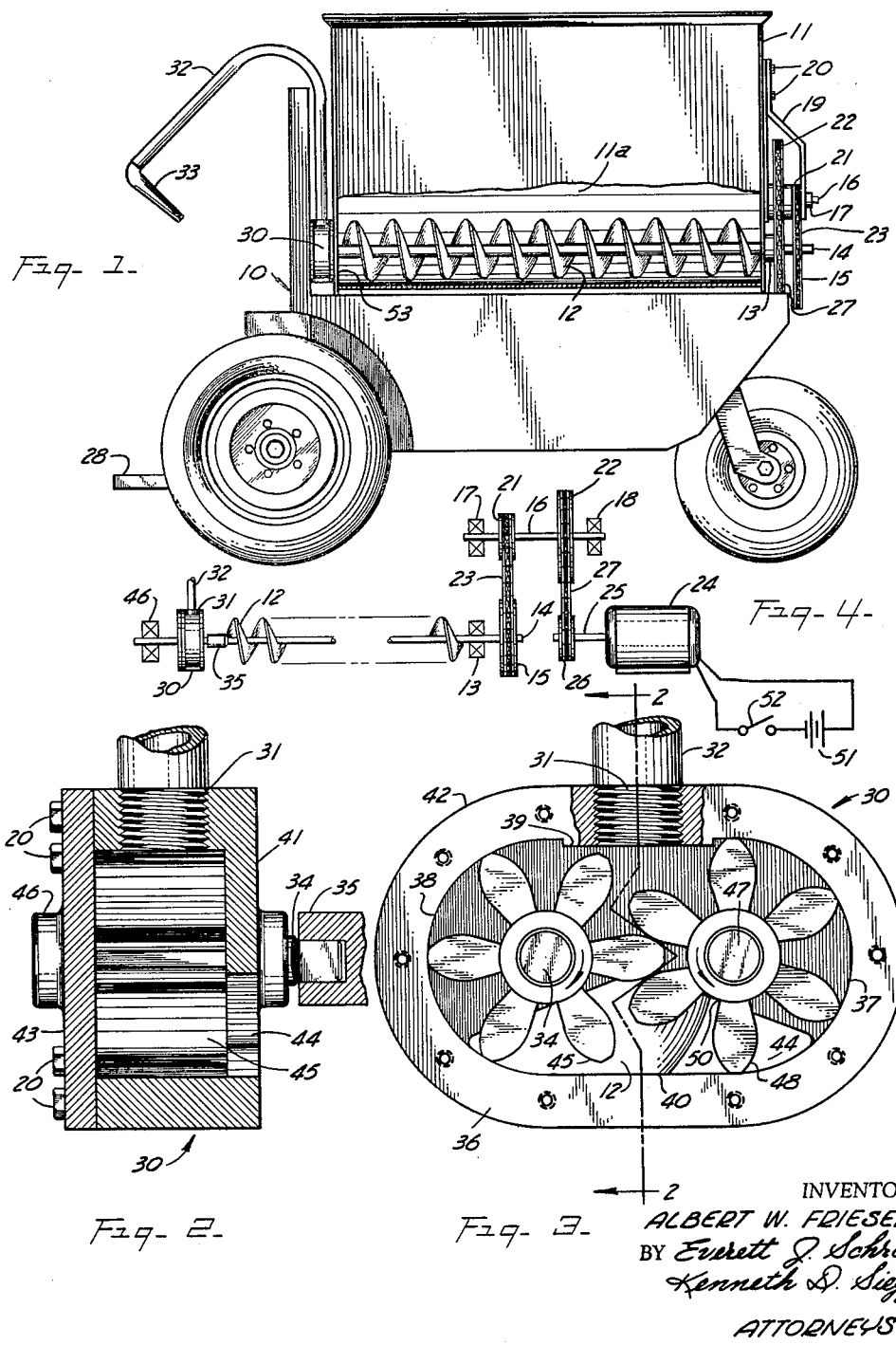

3,159,315
APPARATUS FOR PUMPING MEAT OR POULTRY OFFAL
Albert W. Friesen, P.O. Box 889, Detroit Lakes, Minn.
Filed Apr. 30, 1962, Ser. No. 190,928
4 Claims. (Cl. 222—252)

This invention relates to the field of pumping apparatus and more particularly to the field of apparatus for pumping semi-liquid mink feed material or the like which contains solid pieces similar to meat and poultry offal.

One of the most common problems encountered in the raising of mink is the problem of feeding the mink the proper food and keeping them on a diet which they are accustomed to while in their natural habitat. Generally, different types of meat and poultry and fish products are fed to the mink to keep up their protein content in their diet. It is also important to insure that the proper amount of calcium and minerals are supplied to the animals during their growing period and for this reason, the meat, poultry, or meat offal usually contains some ground up or broken pieces of bone. Along with the bone which is contained in the offal, are piece of skin and cartilage or gristle. In other words, the protein and mineral content is obtained through the meat, poultry, or fish offal which may be supplemented with other types of solid or liquid feed, the combination forming a semi-liquid feed material which contains the solid pieces just referred to. As can be imagined, this type of mixture is heavy and requires means for not only moving it or transporting it to the feeding areas but also because of its semi-liquid nature, requires additional means for getting the mixture from the container to the feeding areas with a minimum amount of work. Various methods have been initiated to pump the semi-liquid material from a tank or container to the feeding troughs or feeding pens but difficulty has been countered due to the solid pieces of bone and other materials found in the offal. Because of the pieces in the offal, special pumps or positive feed mechanisms have been required to handle the feed mixtures.

I have found that by modifying a rotary gear pump, that the pump will handle all food mixtures, including those containing bone particles and other solid materials which are used in the feed for mink or other animals requiring similar feed. By using the modified structure of a rotary gear pump, I am able to pump the mink feed containing the solid pieces found in the meat, poultry, or fish offal from the container which is movable, to the mink pens or feeding areas.

It is therefore a general object of my invention to provide an improvement in pumping apparatus for pumping semi-liquid mink feed materials from a container.

It is another object of the present invention to provide an improvement in pump apparatus for pumping semi-liquid materials used for animal feed containing pieces of solid material similar to meat and poultry offal.

It is yet another object of the present invention to provide an improvement in apparatus for pumping meat or poultry offal from a tank for mink feeding purposes.

It is still a further object of this invention to provide a rotary gear type pump having sufficient clearance between the gears for admitting bone particles to be moved through the pump.

It is still another object of the present invention to provide a rotary gear type pump driven and positively fed by an auger located in a tank of semi-liquid mink feed material containing solid pieces similar to meat and poultry offal.

These and other objects and advantages of my invention will more fully appear from the following description, made in connection with the accompanying drawings, wherein like reference characters refer to the same or similar parts throughout the several views, and in which:

FIG. 1 is a drawing of the pump mounted on a feed transporting apparatus having a portion of the tank shown in cut away sections;

FIG. 2 is a cross sectional view of the rotary gear pump taken along section lines 2—2 of FIG. 3;

FIG. 3 is an elevation view of the pump with the outside cover removed showing the modification to the gears contained therein; and FIG. 4 is an operational diagram showing the power driving arrangement.

FIG. 1 shows a cart or power driven tractor 10 which is driven by a pair of wheels and is steerable by a front wheel. Any means of moving the apparatus from one location to another is satisfactory for the purposes of illustrating my invention. Mounted upon cart 10 is a tank 11 as shown in FIG. 1 which has a broken or cut away portion 11a showing the inside of the tank. Generally, the tank is formed with sloping sides or with a rounded bottom or possibly both. Situated in the bottom of tank 11 is a screw type auger 12 which is journalled in a bearing 13 at the front end of the tank 11. A shaft 14 which is coextensive with the shaft of auger screw 12 extends beyond the front end of tank 11 and has a sprocket gear 15 connected thereto. Another shaft 16 is journalled in a pair of bearings 17 and 18. Bearing 17 is fastened to the front end of tank 11 and a bracket 19 which is fastened to tank 11 by bolts or other suitable means 20 extends downwardly from its point of attachment near the top of tank 11 and outwardly to house bearing 18. Situated between bracket 19 and the front end of tank 11, are a pair of sprocket gears 21 and 22 where gear 21 is relatively small in comparison to gear 22. Also, gear 15 is approximately the same size as gear 22. A sprocket chain 23 connects sprocket gear 15 to sprocket gear 21 and a motor 24 (not shown in FIG. 1) has a shaft 25 which has a sprocket gear 26 connected thereto with a sprocket chain 27 connecting sprocket gears 22 and 26. Sprocket gear 22 is approximately the same size as sprocket gear 15 and sprocket gear 26 is approximately the same size as sprocket gear 21. It is obvious that the sprocket gears can take on different diameters and that different gearing arrangements may be made, keeping in mind, that the amount of torque required to rotate auger screw 12 and the speed with which it turns should be kept at optimum operating characteristics. Cart 10 also has a platform 28 associated near the rear side and near the bottom portion of the cart so that the operator may stand upon the platform during movement of the cart through the feeding areas.

Situated at the rear end of tank 11 is a pump 30 which has an outlet or discharge orifice 31 located near the top of the pump. Connected to the orifice, is a flexible tubing 32 which terminates in a nozzle 33 for directing the flow of the semi-liquid material described previously. As will be seen later, pump 30 has a shaft 34 which is coupled to the shaft of auger screw 12 through a square shank coupling 35. That is, the end of shaft 34 has a square, and reduced cross sectional area, that fits with a female mating portion 35 forming the releasable coupling. As will be seen later, by the removal of bolts or other suitable fasteners, pump 30 may be removed from the outside of tank 11 and pulled away from tank 11 and thereby disengaging the releasable coupling 35 from shaft 34 of pump 30.

Pump 30 has a housing 36 which has a pair of diametrically disposed semi-circular shaped ends 37 and 38 which are joined by a pair of top and bottom sides 39 and 40 which are substantially parallel to each other and parallel to the tangents of semi-circular shaped ends 37 and 38. The housing 36 is completed by an integrally formed plate 41 and by a flanged front member 42 which extends outwardly and away from housing 36 so that a cover plate 43 may be attached thereto by suitable means such as bolts 20. A triangular shaped opening 44 is cut in plate 41 near the bottom of the plate and near and adjacent to side 40 of housing 36. Opening 44 forms the inlet orifice to the pump so that the semi-liquid material may be easily forced into the pump 30. Situated upon shaft 34, is a gear 45 where gear 45 is fixedly fastened to shaft 34, the shaft being journalled in a bushing formed in plate 41 and in another bushing 46 formed in the outer edge of plate 43. In other words, shaft 34 rotates gear 45 within housing 36 and specifically gear 45 communicates with the semi-circular shaped end 38 of the housing. Another shaft 47 is located within housing 30 and is fixedly connected to a gear 48 which is in working communication with gear 45. Shaft 47 is journalled in plate 41 and is journalled in cover plate 43 in the same manner as journal 46. Gear 48 is in free rotating communication with semi-circular shaped end 37. As can best be seen in FIG. 3, auger screw 12 is shown in material delivering relationship with pump inlet orifice 44 so that the heavier particles which will not flow of their own accord are forced directly into pump 30 in communication with gears 45 and 48 so that the material is caught by the gear teeth of the two gears. Each of the gears comprises a gear hub having an imperforate portion between the hub bore and the root circle of the gear. The gear teeth have normal chordal thickness and define normal addendum and pitch circles. However, the gears contain a greater than normal dedendum defined as the radial distance from the pitch circle to the root circle and consequently have a greater than normal clearance defined as the difference between the dedendum and the addendum distances. In other words, the distance between the end of a tooth and the bottom of the mating space has been increased by cutting away some of the material below the root circle of the gear to provide an additional space therebetween designated as numeral 50, it being understood that this additional clearance is provided between each of the mating gear teeth of gears 45 and 48. It is this additional clearance that allows the offal containing bone particles and other such solid particles of skin and gristle to be compressed therein and allows the larger particles, that were trapped between the teeth to pass through the pump without jamming. As can readily be understood, if a piece of solid material were to be compressed between a pair of normal gears, the gear teeth will bind and will jam together in such a manner as to render the pump inoperable. With the additional clearance, these so called "solid" pieces are allowed to rotate in the additional clearance space which is not possible with the previous type rotary gear pumps available.

Since cover plate 43 is easily removable, and because shafts 34 and 47 are journalled in bearings in the cover plate 43 which is easily removable, both gears 45 and 48 with their associated shafts 34 and 47 are easily removable for cleaning the entire pump if so desired. It should also be apparent that by the introduction of water into tank 11, that gears 45 and 48 will force the water out through orifice 31 and flexible tubing 32 to flush out the entire system.

In order to control the period for which the pump will operate, motor 24 is connected to a battery 51 which is connected in series with a switch 52 that forms the return circuit to the motor 24 so that the pump may be operated only during those periods when it is desirable to do so.

To aid the suction created by pump 30 in moving the semi-liquid feed material into communication with pump 30 by auger screw 12, an opening 53 is formed in tank 11 which is generally of the same size and dimensions as opening 44 in pump 30, and is in communication therewith to allow the semi-liquid material to be removed from tank 11. It should also be obvious that for some applications, it may be desirable to locate pump 30 in the tank 11 without cutting a hole in the tank and merely extend the flexible tubing 32 up the inside of the tank. For other situations, it may be more desirable to locate pump 30 below the bottom of tank 11 where opening 44 is in communication with the bottom of tank 11, it being understood that a common opening in tank 11 would communicate with opening 44 to allow the material to enter opening 44 and of course this may be aided by the use of auger screw 12.

Returning briefly to the pump 30, I have found that when the clearance between the working depth of the tooth of one spur gear which is measured from the addendum circle radially inward, and the root circle of the other gear, is approximately equal to $3/16$ to $1/4$ inch for a gear defining an addendum circle with a diameter of approximately four inches, that satisfactory performance is obtained. That is, the spacing between the ends of the teeth of the first gear and the mating spaces of the second gear is sufficient to admit the solid material pieces of the semi-liquid material. In other words, the spur gears, from their pitch circle radially outward are formed in a normal fashion, but the clearance between the end of a mating tooth of a first gear between two teeth of a second mating gear and the root circle of the second mating gear has been increased an amount sufficient to allow the largest solid particles to be compressed therebetween and pass back from the outlet orifice to the inlet orifice and be mixed with incoming material to be carried again to the outlet orifice.

In operation, the semi-liquid mink feed material or the like which contains solid pieces similar to meat and poultry offal is loaded into tank 11 and the cart 10 is moved to the feeding area. The feed material is then directed to the pump inlet orifice 44 by closing switch 52 and causing rotation of auger screw 12 to move the feed into the inlet orifice. Gears 45 and 48 pick up the feed material and because of the cooperating action between the gears, where gear 48 is rotated counterclockwise and gear 45 is rotated clockwise, the feed is directed outwardly against ends 37 and 38 respectively and upwardly toward the outlet orifice 31. Some solid particles of the feed may be carried past the outlet 31 by the teeth. Any solid particles which have remained between the teeth are compressed into the clearance where they remain until the gears return them to the area of the inlet orifice 44 where they are picked up and carried along by the incoming semi-liquid material to and through the discharge orifice 31. Such particles in my new pump are carried in the additional clearance area between the end of one tooth, the sides of the two cooperating teeth of the other gear, and the hub of the other gear. Once the space is open after the end of the one tooth passes out of the way, such particles are pushed along with the liquid material through the outlet of the pump. In this manner, such particles are prevented from jamming the pump. Of course the feed is directed to the particular area desired by flexible tubing 32 and once a sufficient amount of feed has been deposited, switch 52 is opened thereby stopping the pumping operation.

From the foregoing description of my invention it will be seen that I have provided means for pumping semi-liquid mink feed material or the like which contains solid pieces similar to meat and poultry offal. As can readily be understood, the use of such a device will ultimately result in a saving in labor costs to the operator of the equipment. By the use of the pump which has the clearance increased between the cooperating teeth, it is possible to pump the solid particles along with the liquid material which heretofore has been impossible with the use of gear type pumps. By the use of the auger for positive feed of the pump, a continuous supply of feed is pumped from the tank to the feed area. Because of the simplicity of the apparatus, it is quite easy to clean and the maintenance costs are extremely low.

While the material used to make gears 45 and 48 is generally formed from iron, it may also be desirable to form the gears from certain types of plastics such as nylon or Teflon. It may be found that other suitable plastics may be used which are readily machineable and which resist corrosion and have a high resistance to wear. It is well known that there are several plastics which are highly resistant to moisture and it may be beneficial to use some form of plastic if the feed should produce toxic results when combined with certain types of metals. It will of course be understood that the plastic gears 45 and 48 would have the same general characteristics as those formed from metal such as iron, particularly in regards to their final shape.

In regards to the descriptions set forth for gears 45 and 48, reference may be had to pages 492 and 493 of "Technical Drawing" by Frederick E. Giesecke, Alva Mitchell, and Henry C. Spencer, Second Edition, published by the Macmillan Company.

It will, of course, be understood that various changes may be made in the form, details, arrangement, and proportions of the parts without departing from the scope of my invention which consists of the matter shown and described herein and set forth in the appended claims.

I claim:

1. A power driven pump for pumping semi-liquid mink feed material or the like which contains solid pieces, similar to meat and poultry offal comprising:
  (a) a housing having a pair of diametrically disposed substantially semi-circular shaped ends joined by first and second sides oppositely disposed and substantially parallel to tangents of said ends with third and fourth sides overlying and attached to said ends and said first and second sides to form a chamber;
  (b) a discharge orifice formed in one of said first and second sides approximately midway between said semi-circular ends for discharging the material from said pump;
  (c) a first power driven spur gear having an imperforate hub supported for rotation within said chamber in one of said semi-circular ends, said spur gear having normal pitch and addendum circles including non-compressible teeth with more than normal clearance between its working depth measured radially inward from the addendum circle and its root circle as defined by the gear hub, the addendum circle of said spur gear defining a diameter less than the diameter defined by said semi-circular shaped ends;
  (d) a second spur gear having an imperforate hub supported for rotation in a direction opposite to said first spur gear within said chamber in the other of said semi-circular ends and disposed to cooperatively engage said first spur gear, said second spur gear having non-compressible teeth with more than normal clearance between its working depth and root circle so that spaces between the ends of the teeth of said first spur gear and the mating spaces of said second spur gear are sufficient to admit the solid material pieces of the semi-liquid material and rotate therewith, the addendum circle of said second spur gear defining a diameter less than the diameter defined by said semi-circular shaped ends;
  (e) and an inlet orifice formed in one of said sides but disposed away from said discharge orifice facing adjacent to the teeth of said first and second spur gears and causing the semi-liquid material to flow in communication therewith and carry the solid pieces out through said discharge orifice at a rate proportional to the rate of rotation of said first and second gears.

2. A power driven pump for pumping semi-liquid mink feed material or the like which contains solid pieces similar to meat and poultry offal comprising:
  (a) a housing having a pair of diametrically disposed substantially semi-circular shaped ends joined by first and second sides oppositely disposed and substantially parallel to tangents of said ends with third and fourth sides overlying said ends and said first and second sides to form a chamber;
  (b) a discharge orifice formed in one of said first and second sides approximately midway between said semi-circular ends for discharging the material from said pump;
  (c) a first power driven spur gear having an imperforate hub supported for rotation within said chamber in one of said semi-circular ends, said spur gear having non-compressible teeth, the ends of which define its addendum circle with clearance space between its working depth and root circle substantially equal to the largest particle contained in such semi-liquid feed material, the working depth extending radially inward from said addendum circle and the root circle defining the gear hub circumference, the addendum circle of said spur gear defining a diameter less than the diameter defined by said semi-circular shaped ends;
  (d) and a second spur gear having an imperforate hub supported for rotation in a direction opposite to said first spur gear within said chamber in the other of said semi-circular ends and disposed to cooperatively engage said first spur gear, said second spur gear having non-compressible teeth clearance between its working depth and root circle substantially equal to the largest particle contained in such semi-liquid feed material so that spaces between the ends of the teeth of said first spur gear and the mating spaces of said second spur gear are sufficient to admit the solid material pieces of the semi-liquid material and rotate therewith, the addendum circle of said second spur gear defining a diameter less than the diameter defined by said semi-circular shaped ends;
  (e) and, an inlet orifice formed in one of said third and fourth sides and disposed away from said discharge orifice and adjacent to a peripheral edge of said chamber and the teeth of said first and second spur gears causing the semi-liquid material to flow in communication therewith and carry the solid pieces out through said discharge orifice at a rate proportional to the rate of rotation of said first and second gears.

3. Power driven apparatus for pumping semi-liquid mink feed material or the like which contains solid pieces similar to meat and poultry offal from a storage tank, comprising:
  (a) a tank for containing a semi-liquid material, said tank having a pair of sides and a bottom with a first and second end joined thereto;
  (b) a gear type pump having a housing containing inlet and discharge orifices communicating with a chamber including diametrically disposed semi-circular shaped ends in which are disposed a pair of communicating gears having imperforate hubs and non-compressible teeth, said gears being journalled in said housing chamber on a pair of shafts so that spaces between the ends of the teeth and the root circles of said gears are sufficient to admit the solid pieces of the semi-liquid material, at least one of said gears being fixedly coupled through one of said pair of shafts, the addendum circles of said gear defining a diameter less than the diameter defined by said semi-circular shaped ends;
  (c) means fastening the inlet orifice of said pump in communicating relationship with said tank;
  (d) an auger rotatably supported within said tank and in material delivering relationship with said pump inlet orifice;
  (e) a motor operatively connected to said auger and said shaft fixedly coupled to one of said gears for rotation thereof;

(f) and, flexible tubing connected to the discharge orifice of said pump to control the direction of flow of the semi-liquid material therefrom.

4. Power driven apparatus for pumping semi-liquid mink feed material or the like which contains solid pieces similar to meat and poultry offal from a storage tank, comprising:
 (a) a tank for containing a semi-liquid material, said tank having a pair of sides and a bottom with a pair of ends joined thereto, said tank having an opening formed therein communicating with said bottom;
 (b) a gear type pump having a housing containing inlet and discharge orifices communicating with a chamber including diametrically disposed semi-circular shaped ends in which are disposed a pair of communicating gears having imperforate hubs and non-compressible teeth, said gears being journalled in said housing chamber on a pair of shafts so that spaces between the ends of the teeth and the root circles of said gears are sufficient to admit the solid pieces of the semi-liquid material, at least one of said gears being securely coupled through one of said pair of shafts, the addendum circles of said gears defining a diameter less than the diameter defined by said semi-circular shaped ends;
 (c) means fastening the inlet orifice of said pump in communicating relationship with said opening in said tank;
 (d) motor means operatively connected in driving relationship to said pump;
 (e) and tubing means connected to the discharge orifice of said pump to control the direction of flow of the semi-liquid material therefrom.

References Cited in the file of this patent

UNITED STATES PATENTS

| | | |
|---|---|---|
| 1,808,804 | Baldner et al. | June 9, 1931 |
| 2,833,224 | Meyer et al. | May 6, 1958 |
| 3,023,706 | De Fezzy et al. | Mar. 6, 1962 |
| 3,053,191 | Weigert | Sept. 11, 1962 |